Patented Feb. 5, 1935

1,990,382

UNITED STATES PATENT OFFICE 1,990,382

CEREAL FOOD

John L. Kellogg, Chicago, Ill., assignor, by mesne assignments, to Associated Patents, Inc., Kalamazoo, Mich., a corporation of Delaware No Drawing. Application January 28, 1932, Serial No. 589,530

7 Claims. (Cl. 99—10)

This invention relates to puffed cereal foods for use as breakfast foods and otherwise, and has for its object to provide a method of preparing such foods which will produce a highly puffed, roasted cereal food containing all of the vital elements of the grain, exceedingly crisp and nutritious, and which will not become soggy in either milk or cream. With this object in view I take a cereal, such as wheat or rice, and cook the same in a closed steam cooker in the presence of moisture until the grains are thoroughly cooked. After the grains are cooked I subject the closed vessel to the action of approximately twelve or more inches of vacuum, at the same time supplying a current of air to the cooker, the air being supplied in such a way that it is permitted to pass up through the cooked grain. This vacuum treatment is continued until the steam is extracted from the cooker. The grain may then be passed, while hot, directly from the cooker between hot rolls so spaced apart as to flatten or compress the grains more or less but without rolling them into thin, shaving-like flakes. After rolling, the grains are partially dried, that is, the exterior surface of the grain is dried, the interior of the grain still containing moisture of approximately 15%. Preferably the partially dried compressed grains are then permitted to stand in bins, bags or other masses for "tempering", that is, to permit the moisture contained in the grains to be uniformly distributed throughout each grain. This will ordinarily require about twelve to fifteen hours or longer, and may take place at room temperature. I then apply a moisture-occluding coating to each flattened tempered grain. Preferably this is accomplished by treating the grain with a water solution of a substance or substances which, when the water is dried out, will leave the grains coated with the solid which was contained in the solution. Preferably I spray or otherwise treat the tempered grains with a water solution containing about 2% salt and 6% sugar, although these percentages may be varied to taste. This spraying treatment is continued until from 15% to 20% of moisture is added to the tempered grains, after which they are again partially dried. This second drying action leaves the grains coated with the sugar and salt contained in the solution and also serves to flavor the product. After the grains are thus partially dried they are again "tempered", that is, they are permitted to stand for approximately fifteen or sixteen hours in a mass or until the moisture in the grain is uniformly distributed throughout each grain. After they have been thus coated and tempered, the grains are passed through a suitable roasting or toasting oven where they are subjected to a high temperature, preferably approximating 600° F.

The sugar and salt coating on the grains serves to occlude the moisture within the grains, and when they are submitted to the roasting temperature indicated, the moisture is converted into steam, but is temporarily retained within the grain until the internal pressure reaches a point where it pops or bursts the grain, that is, it explodes the starch cells of the cereal. This explosive action can be heard plainly, being, however, more pronounced in some grains than in others. The result of this exploding of the starch cells is the enlarging or puffing up of the grain to several times its original size. Wheat will be puffed from five to six times its original size, and rice from six to seven times its original size.

While I prefer to use the sugar and salt solution indicated above to coat the surface because it performs the dual function of coating and flavoring, other solutions may be employed for the coating operation, such as solutions of egg albumen, casein, flour paste, starch paste and the like.

By compressing the grain while it is hot as it comes from the cooker, instead of partially drying and then flaking the grain as heretofore practiced, the final product, after explosion of the grain, will be increased from 20% to 30% more than heretofore secured. The exact reason for this, however, is somewhat obscure, but it is believed that by compressing the grain before drying, the starch cells are compressed so that they more efficiently occlude the moisture until the same is converted into steam, and it is this high pressure internal steam that produces the puffing.

The product thus secured contains all of the nutritive properties of the natural grain, including the bran, is cooked ready to serve, and is exceedingly crisp and palatable.

Reference is made to my co-pending application Serial No. 619,610, filed June 27, 1932, allowed November 22, 1934, wherein certain subject-matter disclosed herein is set forth and claimed.

Having thus described the invention, what is claimed is:

1. The process of treating cereal grains which consists in cooking the same in a closed vessel in the presence of moisture, passing air up through the mass of cooked grains while subjecting the closed vessel to a vacuum, whereby the grains are separated, then flattening the grains while hot, then partially drying the flattened grains, then tempering the grains, then moistening the partially dried and tempered grains with a sugar and salt solution, again partially drying the grains and then subjecting them to a high toasting temperature.

2. A process of treating cereal grains which comprises the steps of steam cooking the grains in moisture, passing air up through the cooked grains while subjecting them to a vacuum, compressing the grains hot from the cooker, partially drying and then tempering the same, then treating the tempered grains with a dissolved solid, evaporating the solvent from said solid, whereby the grains are coated with the solid, and then subjecting the coated grains to a high temperature to puff the same.

3. A process of treating cereal grains which comprises the steps of steam cooking the grains in the presence of moisture, then subjecting the cooked grains to a vacuum treatment until the steam is removed therefrom, then rolling the grains while hot to flatten the same, then partially drying and tempering the flattened grains, then applying a moisture-occluding coating to the grains, and then subjecting the coated grains to a toasting temperature, whereby they are puffed and toasted.

4. A process of treating cereal grains which comprises the steps of subjecting moist, steam cooked grains to a partial vacuum, then compressing the grains while still hot but without reducing them to shaving-like flakes, then partially drying and tempering the grains, then treating the grains with a sugar and salt solution, again partially drying and tempering the grains, and then subjecting the grains to a toasting temperature whereby they are puffed and toasted.

5. A process of treating cereal grains which comprises the steps of steam cooking the grains in the presence of moisture, in a closed container, extracting the steam from the grains while still in the container, compressing the grains while still hot but without reducing them to shaving-like flakes, partially drying and tempering the compressed grains, then spraying the grains with water having sugar and salt dissolved therein, then again partially drying and tempering the grains, and then subjecting them to a toasting temperature, whereby they are puffed and toasted.

6. A process of treating cereal grains which comprises the steps of cooking the grains in moisture in a closed vessel, extracting steam from the cooking vessel by means of a vacuum while the grains are still therein, then flattening the grains as they come from the cooker partially drying the cooked, flattened grains, spraying the partially dried grains with a solution which, when the solvent is evaporated, leaves the grain with a moisture-occluding coating, again partially drying and then tempering the coated grains, and then subjecting them to a high temperature to puff and brown the same.

7. A process of treating cereal grains which comprises the steps of cooking the grains in moisture in a closed vessel, then subjecting the closed vessel to the action of a vacuum while passing air through the mass of cooked grains until the steam is extracted from the cooker, then changing the form of the cooked grains while still hot, partially drying the same, supplying the partially dried grains with a solution which when the solvent is evaporated leaves a solid on the surfaces of the grains, evaporating the solvent, and then subjecting the grains to a toasting temperature.

JOHN L. KELLOGG.